April 29, 1969  J. LETO  3,440,870
POWER INDICATING DEVICE
Filed Aug. 24, 1966  Sheet 1 of 4

INVENTOR.
JOSEPH LETO
BY
Kenway, Jenney & Hildreth
ATTORNEYS

FIG. 4

INVENTOR.
JOSEPH LETO
BY
Kenway, Jenney + Hildreth
ATTORNEYS

April 29, 1969 — J. LETO — 3,440,870
POWER INDICATING DEVICE
Filed Aug. 24, 1966 — Sheet 4 of 4

INVENTOR.
JOSEPH LETO
BY Kenway, Jenney + Hildreth
ATTORNEYS

United States Patent Office

3,440,870
Patented Apr. 29, 1969

---

3,440,870
POWER INDICATING DEVICE
Joseph Leto, 17 Sherburne Road,
Lexington, Mass. 02173
Filed Aug. 24, 1966, Ser. No. 574,657
Int. Cl. G01l 3/26
U.S. Cl. 73—115                    9 Claims

ABSTRACT OF THE DISCLOSURE

The invention is a net zero gas-flow device or system for measuring the mean pressures in the cylinders of internal combustion engines, and thus the performance of the engine, and comprises a gas-pressure take-off from one or more cylinders, the take-off leading first to a condensing unit and then to a pulsation damping unit. From the latter, a simple read-out device such as a pressure gauge is used to the mean pressure existing for the entire cycle of the particular cylinder so tapped. The read-out device may be calibrated in terms of output torque.

---

This invention relates to metering devices for engines, and particularly to such devices which are used to measure the mean pressures in the cylinders of internal combustion engines, and the power output of the engines.

The invention consists in part of apparatus for determining the mean value of the instantaneous pressures developed within the cylinder of an internal combustion engine and in part a complete system for reading out the power being developed. The mean cylinder pressure is obtained by introducing cylinder gases to a pulsation damping system. The indication will then show the mean pressure existing for the entire cycle of the engine, and the output gauge or other indicating means may then be calibrated in terms of torque. Basically, the apparatus provides an averaging system effective to damp out individual pulsations, and as will be indicated further in this description, the read-out device can be calibrated simply in terms of output torque since the relationships involved are essentially linear.

A system is also disclosed in which a tachometer circuit is used to give the speed of the invention in terms of a voltage output. To this voltage output is then applied a voltage dividing network, the setting of which is proportional to the mean pressure of the cylinders of the engine. As a result, the output end of the divider network is proportional to the product of (engine) speed and torque, and an output meter is used to indicate power directly.

Attempts have been made to provide simple indicating means for internal combustion engines which will indicate quickly and effectively the power settings of the engine, particularly those used in piston engine aircraft with constant speed propellers. In the laboratory or in the manufacture of internal combustion engines, the power performance or work performance of piston type prime movers is customarily determined by making use of indicator cards and then afterwards computing the mean effective pressure from these cards in known manner. This is laborious and time consuming, and obviously, is not suitable for instantaneous determination of the output of engines during their use either in automobiles, trucks, or aircraft. For power output measurements while the engine is being used, strain gauges have sometimes been applied to the torque transmitting shaft between the engine and the engine itself, the gauge indicating the amount of torque being transmitted. Again, however, this requires time consuming computations to convert the readings of the strain gauge into the output of the engine. Other devices have been proposed for instantaneously measuring the output performance of internal combustion engines by direct reading gauges, these systems making use (as does the present one) of means to average out the pulsations of the gases in the cylinders, but such means have in general not found to be satisfactory because it has been found necessary to translate the readings of the read-out device into the performance characteristics of the engine.

As examples of such devices, attention is called to U.S. Patent 1,429,192 of Sept. 12, 1922 (Davis) and U.S. Reissue Patent 20,303, of Mar. 23, 1937 (Groff).

Therefore, among the several objects and advantages of the invention may be noted the following: the provision of apparatus for determining the mean value of the instantaneous pressures developed within one or more cylinders of an internal combustion engine; the provision of apparatus of the stated class in which the output gauge will indicate directly the torque of one or more of a bank of internal combustion engine cylinders; the provision of a performance indicating apparatus which may be applied to conventional internal combustion engines, either automotive or aircraft, without the need of making any special alternations in the engine cylinder or head; the provision of means for adapting the apparatus of the above classes to a conventional internal combustion engine in a simple and effective manner, and removing the same therefrom when desired easily and without difficulty; the provision of apparatus for measuring both the speed of the engine and its power output; the provision of apparatus of the last named class which incorporates as an operating element the pressure reading apparatus of the aforesaid classes; and the provision of apparatus of any of the above classes which is economical to make, easily operated, and which may be maintained readily. Other objects and advantages will be in part pointed out hereinafter and in part obvious.

The invention accordingly comprises the elements and combinations of elements, features of construction, arrangements of parts, and manipulation of the apparatus all of which will be exemplified in the structures hereinafter set forth and the scope of the application of which will be indicated in the appended claims.

In the accompanying drawings, in which one of the various possible embodiments of the invention is illustrated.

Throughout the drawings, similar reference characters indicate corresponding parts, and the dimensions of certain parts in the drawings may have been modified and/or exaggerated for the purposes of clarity of illustration.

Figure 1:
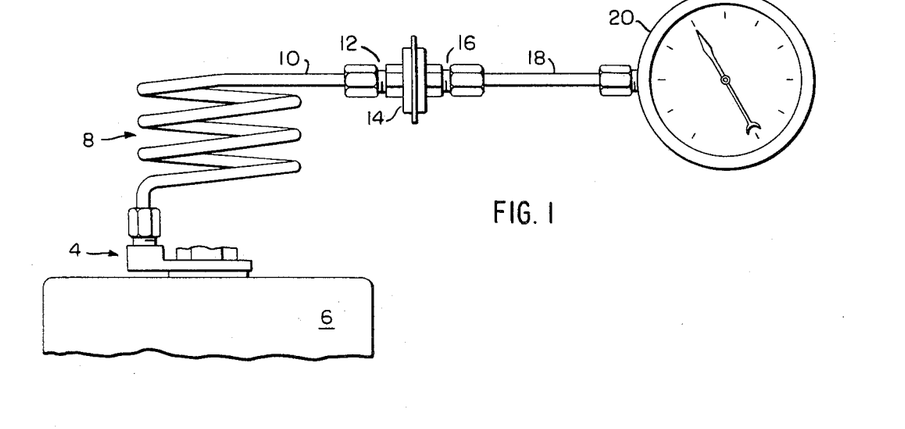
FIG. 1 is a view of one embodiment of this invention.

Referring first to the means for measuring the mean pressure in the engine cylinder, and referring to FIG. 1, there is shown an apparatus of the present invention connected to the combustion chamber of a cylinder of an internal combustion engine. The apparatus comprises a connection 4 made to the top of the cylinder through a specialized gasket and spark plug which will be described below. The exit orifice of the gasket leads to a condenser coil 8, from whence a tubing 10 leads to the entrance nipple 12 of an expansion chamber 14. From the exit nipple 16 of expansion chamber 14, tubing 18 leads to a pressure indicating instrument such as, for example, a Bourdon-tube gauge 20.

Figure 2:
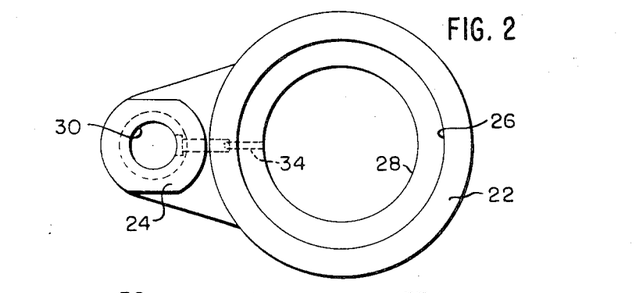
FIG. 2 is a plan view of a gasket used in applying the apparatus of the present invention to the combustion chamber of an internal combustion engine.
Figure 3:
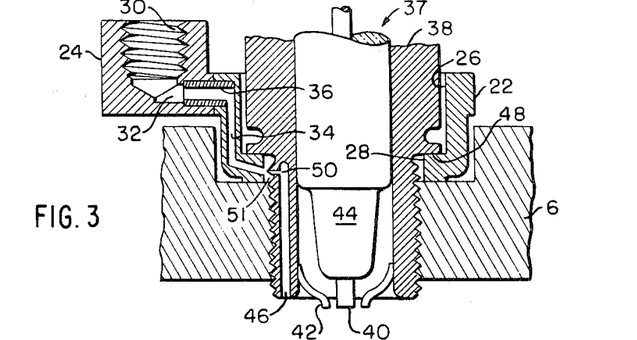
FIG. 3 is a sectional elevation of a portion of a typical engine cylinder with the gasket of FIG. 2 and a portion of a spark plug being attached thereon.

Referring now to FIGS. 2 and 3, there is shown in detail the construction of the specialized gasket referred to above. The gasket comprises a metal body, preferably of some soft material such as copper which can seat hermetically on the surface of the cylinder 6, and comprises two parts: the seating portion 22 proper and the exit portion 24. The seating portion comprises a cup-shaped well having an interior diameter 26 and a portion of lesser diameter 28, the latter being adapted to receive the threaded nipple of a spark plug 37. In use, the spark plug is inserted downwardly (as viewed) through the seating portion 28 and is screwed into the threaded hole leading into the combustion chamber of the cylinder of the engine.

Extending laterally from the side of portion 22 is the exit portion 24 which provides means for attaching to the gasket one end of the condenser coil 8. This connection is conventional, and, as an example, is shown as a threaded hole 30 which is adapted to receive a standard compression fitting, the latter being attached to the end of the coil 8. From the bottom of 24, a passageway 32 leads to the wall of the portion 22, and therein intersects a passageway 34 which leads down (as viewed) the interior of the wall of the cup 22 and then angles laterally, as shown, to intersect the wall of the bore or hole 28. Conveniently, if desired, the parts 22 and 24 can be first made separately, and then the members 22 and 24 connected, as shown, by a sleeve 36 which fits in suitably drilled holes in both members to communicate with passageways 32 and 34. The sleeve may then be silver soldered to both members 22 and 24.

Referring to FIG. 3, there is shown a portion of a modified spark plug which is used in connection with the gasket shown in FIGS. 2 and 3. The spark plug, as is conventional, has the metallic body 38 provided conventionally with an exteriorly-threaded nipple for screwing it into the wall or top of the combustion chamber of cylinder 6. The plug has the customary central electrode 40 and the surrounding electrode 42, the electrode 40 being insulated from the body 38 by means of the ceramic insulation 44.

The plug is modified in that down the interior of the wall of the body 38 is drilled a passageway 46, the dimensions of this passageway being approximately 0.040 inch. One end of passageway 46 terminates adjacent the shoulder 48 of the spark plug as shown. The other end of passageway 46 opens at the end of the plug, and therefore into the combustion chamber of the engine when the plug is in use. A radially extending orifice 50 having a diameter of approximately 0.0135 inch is provided adjacent the inner end of passageway 46 and intersects therewith.

By the above means, a gas-tight connection is made from the interior of the cylinder 6 through the wall of the spark plug, orifice 50, passageway 34, and passageway 32 to the condenser 8, since gas from orifice 50 can escape into the annular space 51 between the threaded nipple of the spark plug and the wall of bore 28 of the gasket, and thence into the passageway 34.

Figure 4:
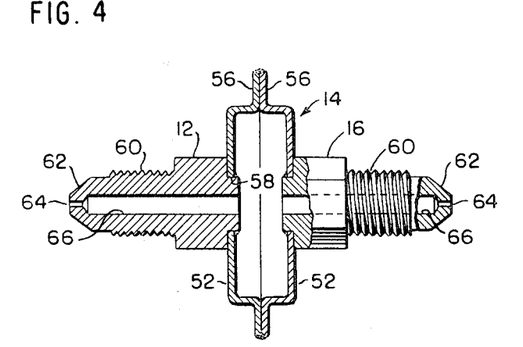
FIG. 4 is a view, partly in section, of an expansion chamber used in the present invention.

Referring now to FIG. 4, there is shown, partly in section, an elevation of the expansion chamber 14 with its two nipples 12 and 16. The expansion chamber is a composite member and comprises two similar parts fastened together, each part comprising a cup 52 and nipple 12 or 16. Each of cups 52 has an outwardly turned flanged perimeter 56, and a hole 58 in the bottom thereof. Each of nipples 12 and 16 is provided with a shouldered projection which fits in hole 58 with a snug fit, and is silver soldered or welded therein. Each nipple is provided with a threaded portion 60, and a tapered end 62 for the purpose of making a conventional compression fitting with the end of the tubing 10. Through the end 62 there is provided an orifice 64 which is approximately 0.0135 inch in diameter. Orifice 64 leads into the larger bore 66 of the nipple which is approximately 0.040 inch in diameter. After the two halves are assembled, as indicated, by silver soldering or welding, then the flanges 56 are placed together and either silver soldered or welded in order to provide a gas-tight joint. The entire pressure chamber is preferably made of stainless steel, as is the condenser 8 and the tubing 10 and 18.

The functions of the orifices 50, 64, and 64, when combined with the volume of the condenser coil 8 and expansion chamber 14, is to average out the pulsations due to the cycles of the cylinder 6 so that the gauge 20 will give a relatively smooth reading. The condenser coil 8 has an additional function in that it provides a place in which additives such as boron in the gasoline used, which additives are vaporized during burning of fuel in the cylinder, have an opportunity to condense, rather than condensing at the orifices 64 and plugging them.

It has been found that the use of the single expansion chamber 14 is sufficient, when combined with the condenser coil 8, to smooth out fluctuations in the pressure end of the cylinder of the engine. If desired, more than one of the expansion chambers 14 may be used if further smoothing is desired.

The apparatus as described consists of means for determining the mean value of the instantaneous pressure developed within a cylinder of an internal combustion engine. As will be shown below, the mean pressure bears a constant relationship to the brake mean effective pressure, and therefore to the torque of the engine. Surprisingly, it has been found that this relationship is approximately linear, and therefore the gauge 20 may be calibrated with an approximately linear scale in order to obtain the torque of the engine being tested.

As indicated, mean cylinder pressure is obtained in this apparatus by introducing cylinder gases to the pulsation damping system comprising the orifice 50, condenser coil 8, orifices 64, and expansion chamber 14. The indication will then show the mean pressure existing for the entire cycle rather than for the single portion of the cycle. Therefore, in a given engine, as stated above, this will bear a constant relationship to the brake mean effective pressure and therefore to torque.

Figure 5:
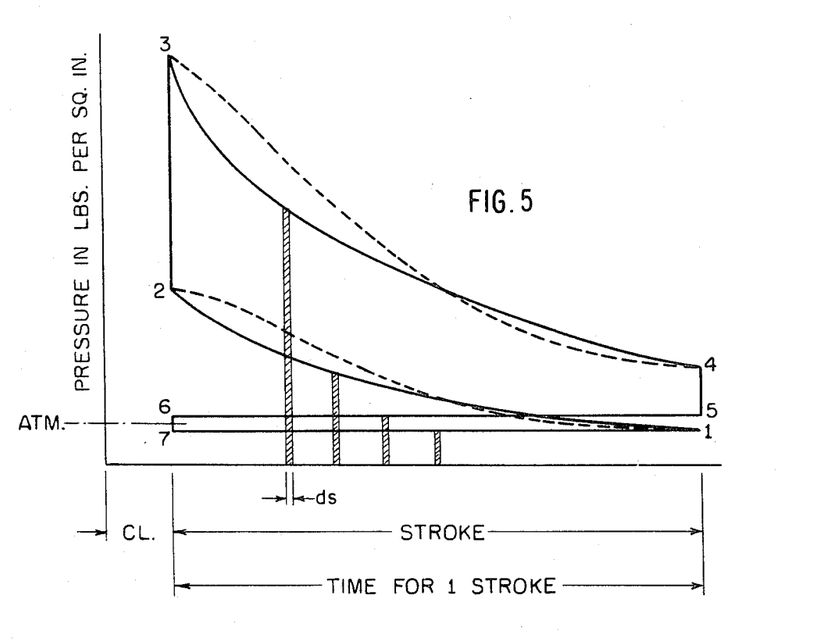
FIG. 5 is an illustration of an ideal indicator card for an internal combustion engine, the illustration being given to assist in the explanation of the invention.

The mean effective pressure existing in an internal combustion engine of the spark-ignited type for a complete cycle thereof may be determined by finding the net work area of an indicator card and dividing it by the stroke. Referring to FIG. 5, this may be represented as follows:

$$M.E.P. = \frac{\text{work per cycle}}{AS}$$

where

M.E.P. = mean effective pressure
A = piston area
S = piston stroke

From FIG. 5

$$\text{M.E.P.} = \frac{A\int_1^2 pds + A\int_3^4 pds + A\int_5^6 pds + A\int_7^1 pds}{AS} \quad (1)$$

where $$A\int_1^2 pds = \text{work of compression} = -W_c$$

$$A\int_3^4 pds = \text{work of expansion} = W_g$$

$$A\int_5^6 pds = \text{exhaust work} = -W_e$$

$$A\int_7^1 pds = \text{intake work} = W_i$$

$$\text{M.E.P.} = \frac{-W_c + W_g - W_e + W_i}{AS} = -p_c + p_g - p_e + p_i \quad (2)$$

The power indicator senses pressure continuously. Therefore its integration is based on time. In FIG. 5, the dotted line represents the pressure variation during the cycle plotted on a time basis.

It can be expressed:

$$\text{I.P.} = \frac{\frac{1}{T}\int_1^2 pdt + \frac{1}{T}\int_3^4 pdt + \frac{1}{T}\int_5^6 pdt + \frac{1}{T}\int_7^1 pdt}{4} \quad (3)$$

where $$\frac{1}{T}\int_1^2 pdt = \text{mean value of pressure existing during compression stroke} = p_{c(t)}$$

$$\frac{1}{T}\int_3^4 pdt = \text{mean pressure during power stroke} = p_{g(t)}$$

$$\frac{1}{T}\int_5^6 pdt = \text{mean pressure of exhaust stroke} = p_{e(t)}$$

$$\frac{1}{T}\int_7^1 pdt = \text{mean pressure of intake stroke} = p_{i(t)}$$

where T is the time for 1 stroke $$\text{then (I.P.)} = \frac{p_{c(t)} + p_{g(t)} + p_{e(t)} + p_{i(t)}}{4} \quad (4)$$

The factor 4 appears because the averaging is done over the entire 4 strokes of the cycle. In order to compare indicated pressure with mean effective pressure, indicated pressure must be multiplied by 4.

$$4(\text{I.P.}) = p_{c(t)} + p_{g(t)} + p_{e(t)} + p_{i(t)} \quad (5)$$

$$(\text{M.E.P.}) = -p_c + p_g - p_e + p_i \quad (6)$$

FIG. 5 shows the exhaust and the intake strokes to be constant pressure functions, therefore $$p_{e(t)} = p_e$$

and $$p_{i(t)} = p_i$$

subtracting Equation 6 from Equation 5, $$(4 \times \text{I.P.}) - \text{M.E.P.} = (p_{c(t)} + p_c) + (p_{g(t)} - p_g) + 2p_e \quad (7)$$

The relation between the dotted curves, and the solid lines on FIG. 5 are constant because they are determined by the geometry of the engine.

Therefore $$\frac{\frac{1}{T}\int_1^2 pdt}{\frac{1}{AS}A\int_1^2 pds} = \frac{\frac{1}{T}\int_3^4 pdt}{\frac{1}{AS}A\int_3^4 pds} = r = \frac{p_{c(t)}}{p_c} = \frac{p_{g(t)}}{p_g} \quad (8)$$

and $$(4 \times \text{I.P.}) - \text{M.E.P.} = p_c(r+1) + p_g(r-1) + 2p_e$$

or $$(4 \times \text{I.P.}) = p_c(r+1) + p_g(r-1) + 2p_e + \text{M.E.P.}$$

The value $r$ does not deviate much from unity. If for the sake of analysis a value 1 for $r$ is assumed, then $$(4 \times \text{I.P.}) = \text{M.E.P.} + 2p_c + 2p_e \text{ approximately}$$

Also, in a spark ignition engine, the compression curve bears a fixed relation to the expansion curve, and a very nearly fixed relation to the net work. Therefore it may be said that within the normally used range of power, $$p_c = B(\text{M.E.P.})$$

very nearly; (B being a constant peculiar (but readily ascertainable) to all engines of a given design) than $$(4 \times \text{I.P.}) = \text{M.E.P.}(1 + 2B) + 2p_e$$

approximately, and I.P. = ¼[M.E.P.(1+2B) + 2$p_e$] approximately.

Exhaust pressure is kept low, particularly in an airplane, being a fraction fo one percent at full power. Therefore if $p_e$ is neglected, it may be stated:

$$\text{I.P.} = \frac{1}{4}(\text{M.E.P.})(1 + 2B) \text{ approximately.}$$

For a given engine geometry, Torque = (C)(M.E.P.). (C being a constant) then, I.P. = D (Torque) approximately, (D being a constant).

Figure 6:
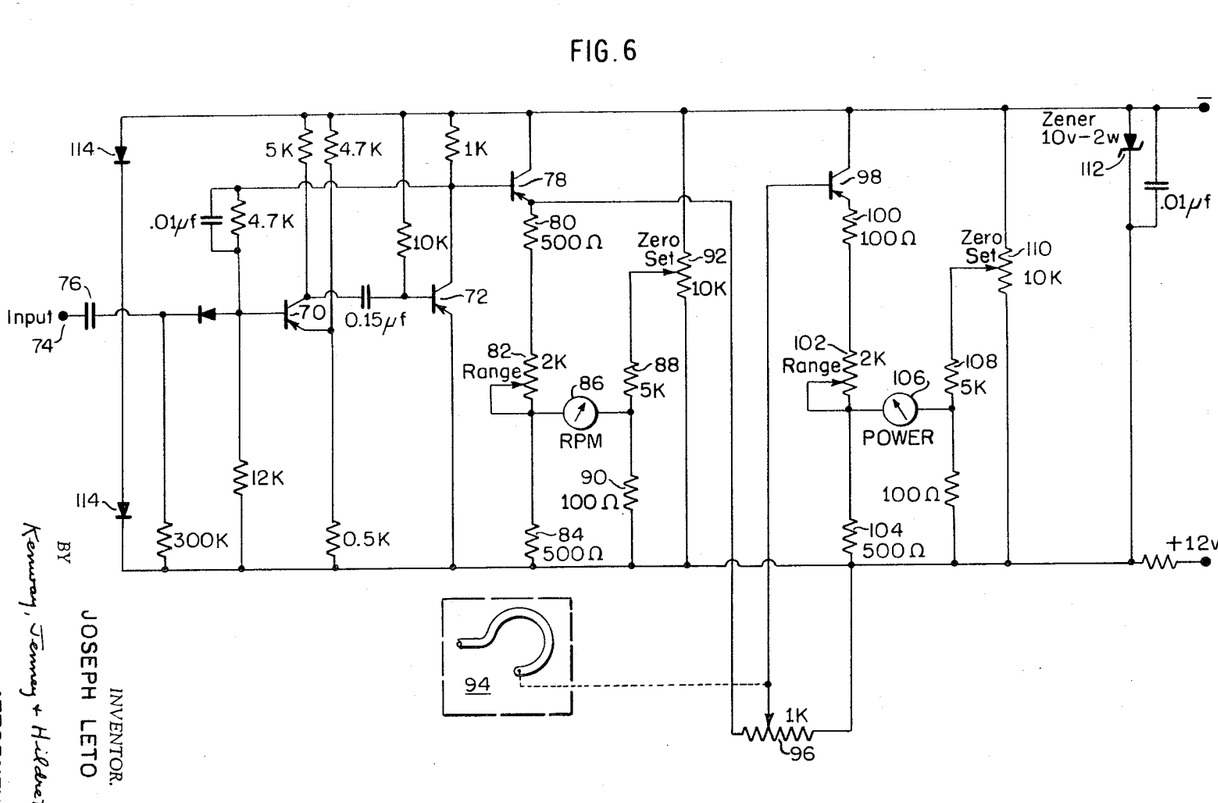
FIG. 6 is a schematic diagram of an electrical circuit that may be used in conjunction with the apparatus of FIG. 1 to measure the power output of the engine, the combination being a second embodiment of the invention.

This means that one can use indicated pressure to measure torque. Proceeding one step further, by the introduction of engine speed on the appropriate dial, one can read power directly. Apparatus for doing this will now be described:

Referring now to FIG. 6, there is shown an exemplary circuit used to obtain a direct read-out of the power performance of the engine. Generally speaking, the circuit comprises a first section which is a monostable multivibrator which acts as a summation device for impulses received by the input thereof from, for example, the breaker-point system of the engine; a second section connected to the output of the first section through a high impedance device, in this instance, a transistor connected as an emitter-follower, this section containing means for reading-out the speed of the engine; a third section comprising a voltage divider network for multiplying the output of the second stage (and thus the speed of the motor) by a voltage proportional to the mean pressure of the engine cylinders; and a fourth section providing means for reading-out the product of motor speed and engine pressure (and thus the power output of the engine) the fourth section being coupled to the previous stage by a high impedance device the latter being, as in the first instance, a transistor connected as an emitter-follower.

The first section is a monostable multivibrator which incorporates the transistors 70 and 72, the base of transistor 70 being connected to the input terminal 74 through capacitor 76. Since the circuit is conventional, no further description of it will be given here. The values of the several components shown in the drawing are such as to adapt the multivibrator to its use as a summation device for impulses received by the input terminal 74. The signals received by terminal 74 may be taken, as an example, from the primary of the engine magneto, an impulse being created every time a breaker-point of the engine opens.

The output of the multivibrator is fed to the base of the emitter-follower transistor 78 and thus looks into a high impedance input. Connected to the emitter of transistor 78 through appropriate resistors 80, 82 and 84 is one side of meter 86, the other side of the meter being connected through the resistor network 88 and 90 to the potentiometer 92. Resistor 82 is made variable, as shown, and by this resistor the range of the meter is adjusted to the range of speed within which the engine will operate. The potentiometer 92 is used to adjust the zero setting of the meter.

A pressure transducer is provided which, as an example, is in this instance schematically shown as the moving element 94, of a Bourdon-tube pressure gauge coupled to the movable arm of the potentiometer 96. Potentiometer 96. Potentiometer 96 is connected to the emitter of transistor 78, and to the positive side of the supply voltage, as shown. The effect of the potentiometer 96 is to modulate the output signal of the transistor 78 (which is proportional to the speed of the engine) in proportion to the cylinder pressure, and thus get a read-out in terms of the power output of the engine. The movable arm of the potentiometer is connected to the base of the transistor 98 which is connected as an emitter-follower, and thus looks into a high impedance. The output of transistor 98 is connected, as shown, to the resistors 100, 102 and 104, resistor 102 being variable. One side of meter 106 is connected to the aforesaid output as shown, and the other side connects through the resistor 108 to the adjustable potentiometer 110. Variable resistor 102 is used to adjust the range of the movement of meter 106 to the range of power output of the engine. Potentiometer 110 is used to adjust the zero setting of the meter 106.

A Zener diode 112 is connected as shown for the purpose of voltage regulation, and a pair of diodes 114 is connected across the power source as shown, to act as a clamping means to limit peak excursions of the input impulse voltages.

In the above circuit, the transistors used are type 2N404A and diodes are type IN482. Other component values are those indicated on the drawing. The meters 86 and 106 are each a 0-1 milliampere movement.

The pressure transducer, which is the combination of the Bourdon-gauge tube 94 and the potentiometer 96 is shown only as an example. Other forms of transducers may be used which are responsive to the pressures in the cylinders of the engine and the output of which may be applied to the output of transistor 78 in order to modulate the output as set forth above.

While the method of using the apparatus will be obvious to one skilled in the art, a brief description is now given: the above described circuit has its input terminal 74 connected to the primary of the engine magneto, and the pressure transducer is connected to the engine cylinders to obtain the mean effective pressures thereof, as first set forth herein. Meters 84 and 106 have their zero settings adjusted by means of the potentiometers 92 and 110, the meters having been precalibrated by resistors 82 and 102 to equate their ranges to the ranges of the functions being measured. The engine is now started, and as the engine is operated, the power output thereof may be observed by reading the meter 106. If the power falls off from that which is expected as normal for the speed indicated by meter 86, then the user of the engine will know that he is getting inefficient performance and will seek the cause thereof.

Figure 7:
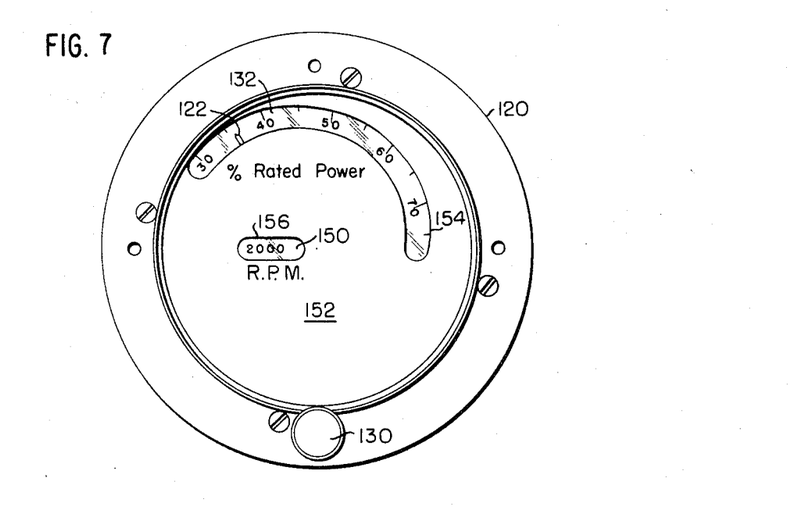
FIG. 7 is a face view of a gauge to be used in a third embodiment of the invention instead of the gauge used in the first embodiment.
Figure 8:
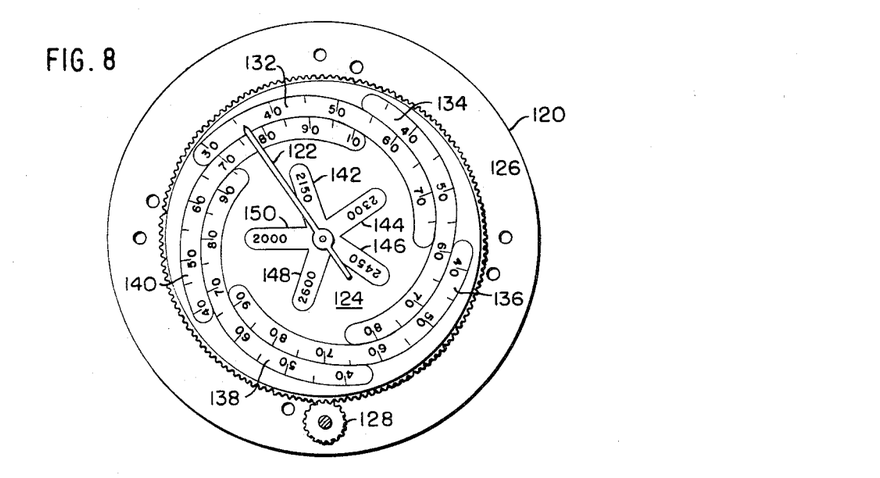
FIG. 8 is a view similar to that of FIG. 7 but with the face-plate of the gauge removed to show the details of the gauge dial.

If it is not desired to use the electrical embodiment thus described for measuring the performance of the engine, a simpler way will now be described as a third embodiment of this invention. Referring to FIGS. 7 and 8, there is shown a pressure gauge, indicated generally by numeral 120, which can be substituted for gauge 20 in the first embodiment (FIG. 1). Except for this substitution, this third embodiment is the same as the FIG. 1 embodiment, and thus the specific description thereof will be limited herein to the construction and use of gauge 120, reference being made to the description of the FIG. 1 embodiment for the details of the rest of the system.

Gauge 120 is a pressure reading gauge such as, for example, one using a Bourdon-type element which rotates an indicator or pointer 122 of means of the usual pinion and rack arrangement (not shown). The Bourdon tube and its associated mechanism are held in a conventional gauge or meter casing.

Rotatably mounted on the face of the casing is the gauge dial 124, the dial being provided with gear teeth 126 on the periphery thereof. A pinion 128 is rotatably mounted in the casing of the gauge, the pinion engaging the gear teeth 126 in order to rotate the dial, this rotation being effected without at the same time rotating the indicator 122. The pinion 128 may be turned by the knob 130 which is accessible from the outside of the casing. The constructions of the rotating dial (so far as thus described), the pinion 128 and the turning knob 130 are conventional, and well known in the art.

Dial 124 is provided with a first series of spirally-curved scales 132, 134, 136, 138 and 140. Also provided, and centrally located on the dial, is a second series of scales 142, 144, 146, 148 and 150, these latter scales being arranged along radii of the dial about the bearing stem for the pointer 122.

Scales 132–140 of the first series are calibrated preferably as shown in percent of rated power or (not shown) directly as horsepower; and scales 142–150 of the second series are calibrated in terms of speed of the engine, that is, revolutions per minute. The two sets of scales coordinate in the following predetermined relationship: Scale 132 with scale 150; scale 134 with scale 142; scale 136 with scale 144; scale 138 with scale 146; and scale 140 with scale 148.

A cover plate 152 made of an opaque substance is fixedly mounted by conventional means on the casing of the gauge, and is provided with a spirally curved sight aperture 154 and a radially aligned sight aperture 156. The shape of aperture 154 corresponds to the shape of the scales of the first series; and similarly, the shape of aperture 156 corresponds to the shape of the scales of the second series. The positioning of the apertures 154 and 156 on the dial face is such that any one of the series of scales 132–140 can be seen through aperture 154, and anyone of the scales of series 142–150 can be seen through aperture 156. By rotating the dial 124 a given pair of coordinating scales can be made to appear in their respective apertures, the other scales remaining hidden. Instead of using a dial face which is made throughout of opaque material and is provided with the aforesaid apertures, a glass plate can be used on which is applied an opaque mask (as by painting) having therethrough the said apertures.

In the above description, the second series 142–150 are referred to as "scales." Properly speaking, a number (for example, 2000 as shown) is not a scale; but for convenience of terminology in this description and in the claims, each of the legends 2000, 2110 etc. is called a "scale."

FIG. 7 illustrates the exemplary use of a given pair of scales 132 and 150, the dial 124 having been rotated to bring into view in aperture 156 that one of the second series of scales which corresponds to the speed of the engine (2,000 r.p.m. in this example). At this time, in accordance with the above description, scale 132 will appear in view in aperture 154. When the engine is adjusted so that it is turning over at 2,000 r.p.m. then in accordance with the foregoing description, the indicator 122 will be actuated by the pressure existing in the engine cylinders, and thus will be indicating the torque. As stated above, speed times torque is the horsepower output of the engine, and thus the scales 132–140 of the first series may be calibrated directly in the horsepower of the engine, or in terms (as is preferred) of the percent of rated power of the engine. In the examples shown in FIG. 7, the percent of rated power of the engine is indicated as approximately 36 percent at a speed of 2,000 r.p.m.

If the performance of the engine at other speeds are desired, then the proper scale of the series 142–150 is brought into view in aperture 156, with the coordinated scale of the series 132–140 being automatically brought into view in aperture 154. Again, the indicator 122 will indicate the percent of rated power of the engine at the speed indicated in the aperture 156.

Preferably, there will be marked permanently on the dial face 152 suitable legends identifying the subject matter appearing in the apertures, and, as indicated, the legend "% Rated Power" is placed near aperture 154, and the legend "R.P.M." is placed near aperture 156.

In view of the above it will be seen that the several objects of the invention are achieved and other advantageous results attained.

It is to be understood that the invention is not limited in its application to the details of construction, and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A net zero gas-flow apparatus for gauging the performance of an internal combustion engine during its entire cycle comprising a system having in combination a condenser, an expansion chamber, a pressure measuring instrument, all serially connected in a gas-conductive system, and attachment means for connecting the inlet of the condenser to the interior of the combustion chamber of at least one of the cylinders of said engine, said system being sealed against atmosphere; said attachment means including a first restricted orifice between said interior and the condenser; and the system including a second restricted orifice between the condenser and expansion chamber and a third restricted orifice between the expansion chamber and said instrument; the material of said attachment means being adapted to be heated by the heat of the engine when in use, thereby to minimize condensation of fuel compounds within the first orifice; and said instrument being calibrated to read the performance of the engine.

2. The apparatus of claim 1 in which the said instrument is calibrated to read, as the performance indication, the mean effective pressure in an engine cylinder.

3. The apparatus of claim 1 in which the said instrument is calibrated to read, as the performance indication, the torque output of the engine.

4. The apparatus of claim 1 in which the said instrument is calibrated to read, as the performance indication, the power output of the engine.

5. The apparatus of claim 1 in which said expansion chamber comprises a pair of cups having their rims hermetically fastened together with the cup interiors forming a chamber, a nipple attached to the bottom of one of said cups and adapted for making connection into said system, and a second nipple attached to the bottom of one of said cups and adapted for making connection into said system, each nipple being provided with a restricted orifice therein for conducting gas into and out of, respectively, the interior of the chamber.

6. The apparatus of claim 1 in which said attachment means comprises a gasket adapted to make a pressure-tight seal against an outer surface of said cylinder when held thereagainst; a spark plug adapted to be attached to the cylinder for firing combustion gases therein, and having a metal skirt as one electrode and a central electrode insulated therefrom; a first passageway in the skirt of the spark plug, one end of the first passageway being located so as to communicate with the interior of the cylinder when the spark plug is attached thereto, the other end of the first passageway communicating with the outer wall of the skirt at a place thereon outside the interior of the cylinder; a bore in said gasket adapted to receive the skirt of the spark plug, the bore having a wall long enough to cover said other end of the first passageway; and a second passageway in said gasket having an inner end communicating with the wall of the bore and so located as to communicate with the other end of the first passageway when the skirt of the plug is inserted in said bore, the outer end of the second passageway communicating with means for connecting the body into said system; at least one of said first and second passageways providing a restricted orifice through which the products of combustion within the cylinder may pass during cycling of the engine.

7. A performance indicating gauge for an internal combustion engine comprising a casing, gas pressure responsive means mounted within the casing, indicating means on the casing and movable by said responsive means, a dial rotatably mounted on the casing to a plurality of positions and having a plurality of scales of a first series thereon, and a plurality of markings of a second series thereon, the scales of the first series being marked to indicate engine performance, and the markings of the second series indicating respective speeds of the engine, and an opaque face plate on the casing and having first and second sight-apertures, the first aperture, when the dial is in each of its positions, exposing to view a respective scale of said first series while the second aperture exposes to view a respective predetermined correlated marking of said second series; said indicating means being adapted to appear in view in the first aperture to indicate engine performance at the speed thereof indicated in the second aperture.

8. The gauge of claim 7 in which each of the first series of scales is spiral in shape and has a portion of the length thereof arcuately overlapping a portion of the length of an adjacent scale of said first series; said indicating means is a pointer rotatably mounted on a stem; and each of the scales of the second series extends in a direction radial to said stem.

9. Apparatus for gauging the performance of an internal combustion engine during its entire cycle comprising in combination a condenser, an expansion chamber, and a pressure measuring responsive instrument, all serially connected in a gas-conductive system; a spark-plug; and attachment means for connecting the condenser to the combustion chamber of the cylinder, the spark-plug having a skirt at one end and an electrode surrounded by the skirt, the wall of the skirt being provided with a bore one end of which opens at the end of the skirt and the other end of which communicates with a first orifice extending radially through the wall of the skirt remote from said one end; said attachment means being a gasket through which said skirt may extend when the latter is inserted in the wall of the engine cylinder, the gasket including a second restricted orifice adapted to communicate with said first orifice and with the condenser, the material of said attachment means being adapted to be subjected to the heat of the cylinder when in use, thereby to minimize condensation of fuel compounds within the second orifice; a third restricted orifice between the condenser and expansion chamber; and a fourth restricted orifice between the expansion chamber and said instrument; and said instrument being calibrated to indicate the performance of the engine.

References Cited

UNITED STATES PATENTS

| | | | |
|---|---|---|---|
| 1,087,883 | 2/1914 | Loomis | 73—392 |
| 1,265,953 | 5/1918 | Pittman | 73—115 |
| 1,422,485 | 7/1922 | Shephard | 73—115 |
| 1,462,109 | 7/1923 | Hopkins | 73—392 |
| 1,960,158 | 5/1934 | Lehmann | 73—115 |
| 2,842,091 | 7/1958 | Kennedy | 73—182 X |
| 2,879,450 | 3/1959 | Baker. | |

FOREIGN PATENTS 117,593  3/1926  Switzerland.

JAMES J. GILL, *Primary Examiner.*

J. W. MYRACLE, *Assistant Examiner.*

U.S. Cl. X.R.

73—394, 415

UNITED STATES PATENT OFFICE
CERTIFICATE OF CORRECTION

Patent No. 3,440,870                    Dated April 29, 1969

Inventor(s) Joseph Leto

It is certified that error appears in the above-identified patent and that said Letters Patent are hereby corrected as shown below:

In the specification, column 5, lines 15-25 should read as follows:

$$A \int_1^2 pds = \text{work of compression} = -W_c$$

$$A \int_3^4 pds = \text{work of expansion} = W_g$$

$$A \int_5^6 pds = \text{exhaust work} = -W_e$$

$$A \int_7^1 pds = \text{intake work} = W_i$$

In the specification, column 8, line 65, the reference 2110 should read 2150.

SIGNED AND
SEALED
MAR 10 1970

(SEAL)
Attest:

Edward M. Fletcher, Jr.
Attesting Officer

WILLIAM E. SCHUYLER, JR.
Commissioner of Patents